US012754503B2

(12) United States Patent
Suzuki

(10) Patent No.: US 12,754,503 B2

(45) Date of Patent: Oct. 6, 2026

(54) IMAGE FORMING APPARATUS

(71) Applicant: CANON KABUSHIKI KAISHA, Tokyo (JP)

(72) Inventor: Yuta Suzuki, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/928,628

(22) Filed: Oct. 28, 2024

(65) Prior Publication Data

US 2025/0164914 A1 May 22, 2025

(30) Foreign Application Priority Data

Nov. 17, 2023 (JP) ................................ 2023-195815

(51) Int. Cl.
*G03G 15/00* (2006.01)

(52) U.S. Cl.
CPC ..... *G03G 15/5029* (2013.01); *G03G 15/6567* (2013.01); *G03G 15/657* (2013.01); *G03G 2215/00717* (2013.01); *G03G 2215/00721* (2013.01); *G03G 2215/00738* (2013.01)

(58) Field of Classification Search
CPC ........... G03G 15/5029; G03G 15/6567; G03G 15/657; G03G 2215/00717; G03G 2215/00721; G03G 2215/00738
See application file for complete search history.

(56) References Cited

U.S. PATENT DOCUMENTS

2006/0222386 A1* 10/2006 Koshida ............... G03G 15/657 399/68
2007/0264033 A1* 11/2007 Koshida ............... G03G 15/657 399/16
2009/0162121 A1* 6/2009 Kitan ................... G03G 15/657 399/400
2015/0071667 A1* 3/2015 Hiroki ................ G03G 15/2014 399/68
2016/0274507 A1* 9/2016 Kurita ................ G03G 15/5062
2019/0127167 A1* 5/2019 Mori .................... G03G 15/657
2019/0225445 A1* 7/2019 Lemmens .......... B65H 23/1955
2021/0243321 A1* 8/2021 Yamaguchi ............ B65H 5/062

FOREIGN PATENT DOCUMENTS

JP H1097154 A 4/1998

* cited by examiner

*Primary Examiner* — David H Banh
(74) *Attorney, Agent, or Firm* — ROSSI, KIMMS & McDOWELL LLP

(57) ABSTRACT

An image forming apparatus includes a conveyance unit, a transfer unit, a fixing unit, a detection unit configured to detect a deflection amount of the sheet, and a control unit configured to control a conveyance speed of the sheet by the fixing unit based on a detection result of the detection unit. The control unit is configured to perform a mode that performs, during a time when a single sheet is being nipped by the conveyance unit, the transfer unit, and the fixing unit, a first process of controlling the conveyance speed of the sheet by the fixing unit such that the deflection amount becomes a first deflection amount, and a second process, performed after the first process, of controlling the conveyance speed of the sheet by the fixing unit such that the deflection amount becomes a second deflection amount smaller than the first deflection amount.

10 Claims, 8 Drawing Sheets

IMAGE FORMING APPARATUS

BACKGROUND OF THE INVENTION

Field of the Invention

This disclosure relates to an image forming apparatus that forms an image on a sheet.

Description of the Related Art

Hitherto, an image forming apparatus including a loop detection sensor arranged between a transfer unit and a fixing unit to detect a loop formed on a sheet is proposed (refer to Japanese Patent Laid-Open No. H10-97154). The loop detection sensor includes a photo interrupter and an actuator that pivots when pressed by a conveyed sheet, and the photo interrupter is turned ON or OFF in response to the displacement of the actuator. A conveyance speed of the sheet by the fixing unit is controlled to be either slower or faster than a process speed based on a detection result of the photo interrupter. Thereby, a loop amount formed on the sheet is controlled to maintain a constant amount.

In the image forming apparatus described in Japanese Patent Laid-Open No. H10-97154, sometimes, the sheet also forms a loop between the transfer unit and a conveyance unit disposed upstream of the transfer unit in a sheet conveyance portion. In this case, a reaction force of the loop formed between the conveyance unit and the transfer unit and a reaction force of the loop formed between the fixing unit and the transfer unit act to offset each other at the transfer unit. However, when a trailing edge of the sheet has passed through the conveyance unit, a force acting on the sheet at the transfer unit abruptly changes, and, sometimes, the sheet slips against the transfer unit. When the sheep slips, an image on the sheet is disrupted, and image defects are caused.

SUMMARY OF THE INVENTION

According to one aspect of the present invention, an image forming apparatus includes a conveyance unit configured to convey a sheet in a sheet conveyance direction while nipping the sheet, a transfer unit arranged downstream of the conveyance unit in the sheet conveyance direction, configured to convey the sheet while nipping the sheet, and configured to transfer a toner image onto the sheet, a fixing unit arranged downstream of the transfer unit in the sheet conveyance direction, configured to convey the sheet while nipping the sheet, and configured to fix the toner image transferred by the transfer unit on the sheet, a detection unit arranged between the transfer unit and the fixing unit in the sheet conveyance direction and configured to detect a deflection amount of the sheet nipped by the transfer unit and the fixing unit in multiple stages, and a control unit configured to control a conveyance speed of the sheet by the fixing unit based on a detection result of the detection unit. The control unit is configured to perform a mode that performs, during a time when a single sheet is being nipped by the conveyance unit, the transfer unit, and the fixing unit, a first process of controlling the conveyance speed of the sheet by the fixing unit such that the deflection amount becomes a first deflection amount, and a second process, performed after the first process, of controlling the conveyance speed of the sheet by the fixing unit such that the deflection amount becomes a second deflection amount smaller than the first deflection amount.

Further features of the present invention will become apparent from the following description of exemplary embodiments with reference to the attached drawings.

DESCRIPTION OF THE EMBODIMENTS

Overall Configuration

Figure 1:
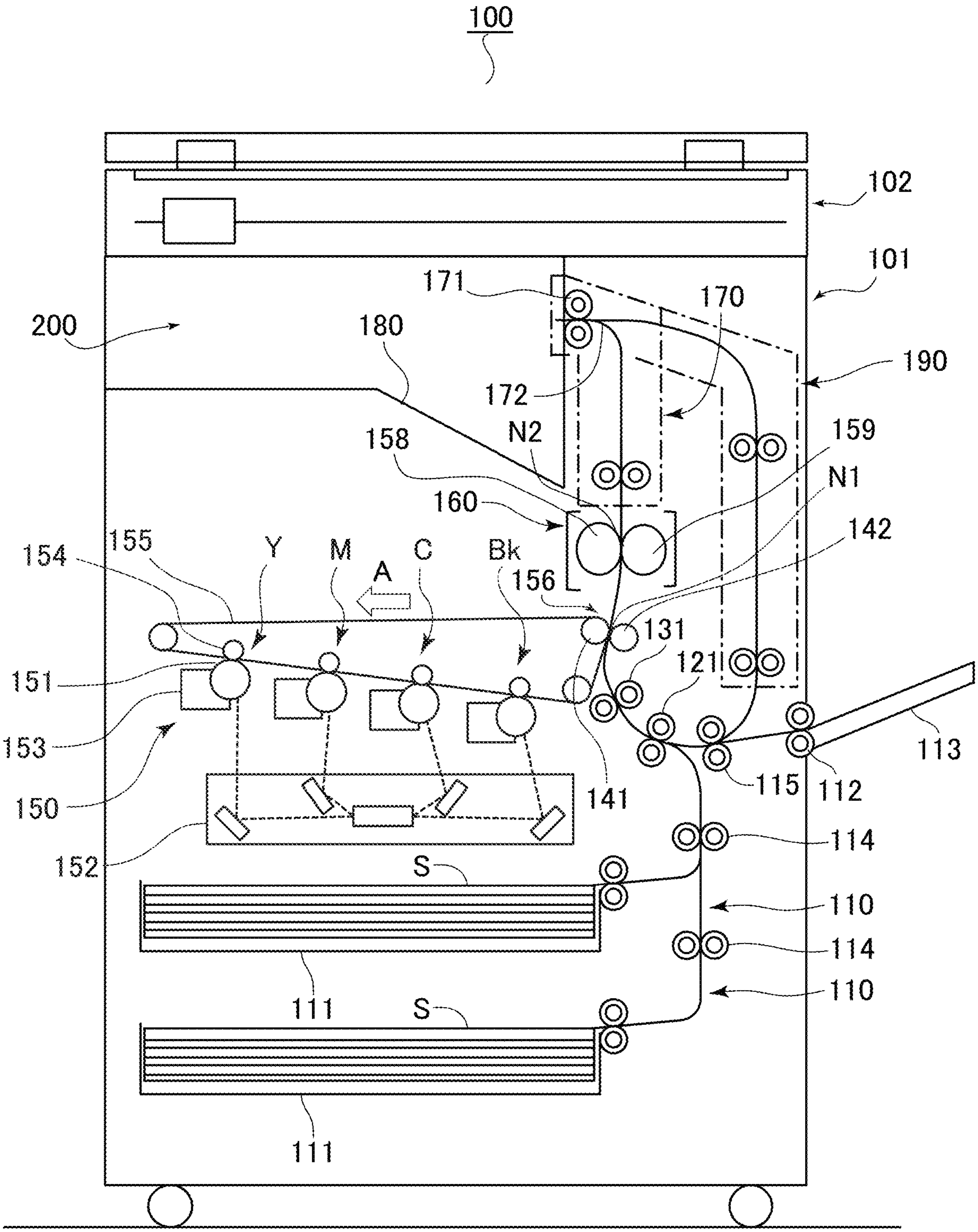
FIG. 1 is an overall schematic diagram illustrating a cross-sectional configuration of an image forming apparatus according to this embodiment.

FIG. 1 is an overall schematic diagram illustrating a cross-sectional configuration of an image forming apparatus 100 according to this embodiment. The image forming apparatus 100 includes an image forming unit 150 forming an image on a sheet S that is a recording material, a sheet feed unit 110, a fixing unit 160, and an image reading apparatus 102. In addition, the image forming apparatus 100 includes an apparatus body 101 that is a casing incorporating the image forming unit 150.

To be noted, the image forming apparatus refers to apparatuses such as printers, copiers, facsimiles, and multifunction machines, which encompass equipment that forms the image on the sheet used as the recording material based on image information input from external personal computers (PCs) or image information read from documents. Further, while, besides a main body having image formation functions, there is a case where auxiliary equipment such as optional feeders, image reading apparatuses, and sheet processing apparatuses are interconnected, the entire system with these interconnected auxiliary equipment is also considered to be a type of the image forming apparatus.

The image forming unit 150 is an electrophotographic unit of an intermediate transfer tandem system in which image forming stations Y, M, C, and Bk, which form toner images of four colors, are arranged along an intermediate transfer belt 155. To be noted, while, in this embodiment, the image forming unit 150 forms the toner image of a full color, it is not limited to this. For example, the image forming unit 150 may be configured to form a monochrome image on the sheet S.

The sheet S is stored in a cassette 111 disposed at a lower part of the apparatus body 101, and is fed one sheet at a time by the sheet feed unit 110. In this embodiment, the sheet feed unit 110 is installed with two units aligned vertically. As the sheet feed unit 110, for example, a unit including a feed roller feeding the sheet S and a separation roller, which is arranged in contact with the feed roller and applies a friction force to the sheet S to separate other sheets S from the sheet S being fed by the feed roller, is used. To be noted, as the sheet S, serving as the recoding material, diverse sheets with varying sizes and materials can be used, and the sheet S includes paper such as standard paper and thick paper, a plastic film, cloth, a surface treated sheet material such as coated paper, specially shaped sheet material such as an envelope and index paper, and the like.

The sheet S that has been fed from the sheet feed unit 110 is conveyed to a pre-registration roller pair 121 by an extraction roller pair 114. The pre-registration roller pair 121 conveys the sheet S to a registration roller pair 131. The registration roller pair 131 is constituted from a roller pair that forms a nip N3. The sheet S, corrected for skew by the nip N3 of the registration roller pair 131, is conveyed toward a secondary transfer unit 156 in a timing synchronizing with a toner image formation process by the image forming unit 150.

The secondary transfer unit 156 includes the intermediate transfer belt 155, a secondary transfer inner roller 141, and a secondary transfer outer roller 142. The secondary transfer inner and outer rollers 141 and 142 substantially face each other across the intermediate transfer belt 155, and a transfer nip N1 is formed by the intermediate transfer belt 155 and the secondary transfer outer roller 142. The secondary transfer unit 156, serving as a transfer unit, conveys the sheet S while nipping the sheet S at the transfer nip N1.

In parallel with the aforementioned conveyance process of the sheet S to the transfer nip N1, the image forming unit 150 performs the toner image formation process. Each of the image formation stations Y, M, C, and Bk of the image forming unit 150 includes a photosensitive drum 151 that is a drum shaped image bearing member (electrophotographic photosensitive member), a charge unit such as a charge roller, and a developing unit 153. In addition, the image forming unit 150 includes a laser scanner 152 arranged below the four photosensitive drums 151. In the toner image formation process, the charge unit uniformly charges a surface of the photosensitive drum 151, and the laser scanner 152 exposes the photosensitive drum 151 based on a signal of the image information to be formed and writes an electrostatic latent image on the surface of the photosensitive drum 151. This electrostatic latent image is developed by toner supplied from the developing unit 153, and becomes a monochromatic toner image. Thereby, the toner images of four colors i.e., yellow, magenta, cyan, and black are formed on the surfaces of the four photosensitive drums 151.

The intermediate transfer belt 155, serving as the image bearing member, is rotatably driven in an arrow A direction in FIG. 1. The toner images borne by the four photosensitive drums 151 are primarily transferred onto the intermediate transfer belt 155 by primary transfer rollers 154 in a manner overlapping each other in sequence. Consequently, finally, the toner image of the full color is formed on the intermediate transfer belt 155, and is conveyed to the transfer nip N1 by being borne by the intermediate transfer belt 155. Then, by a pressure force and an electrostatic bias at the transfer nip N1, the toner image is secondarily transferred onto the sheet S from the intermediate transfer belt 155.

The sheet S that has passed through the transfer nip N1 is conveyed to the fixing unit 160. The fixing unit 160 includes a fixing roller 158 that incorporates a heater, and a pressing roller 159 that comes into contact with the fixing roller 158 with a predetermined pressure force. The fixing roller 158 is driven by a fixing drive motor 163 (refer to FIG. 4), and the pressing roller 159 is rotatably driven by the fixing roller 158. While nipping and conveying the sheet S at a fixing nip N2 formed by the fixing and pressing rollers 158 and 159, the fixing unit 160 applies heat and pressure to the toner image on the sheet S. Thereby, the toner melts, and, after passing through the fixing nip N2, serving as a fixing portion, solidifies to produce the image that is fixed on the sheet S.

The sheet S that has passed through the fixing unit 160 is conveyed by a sheet discharge conveyance unit 170, including a sheet discharge roller pair 171. Then, the sheet S is conveyed toward the outside of the apparatus body 101 by the sheet discharge roller pair 171. On the top of the apparatus body 101, a sheet discharge tray 180 is disposed, and the sheet S that has been discharged by the sheet discharge roller pair 171 is supported on the sheet discharge tray 180. An upper surface of the sheet discharge tray 180 is inclined upward toward a downstream side in a sheet discharge direction. The sheet S supported on the sheet discharge tray 180 slides upstream by its own weight in the sheet discharge direction along the inclination of the sheet discharge tray 180. An alignment surface extending in the vertical direction is disposed on the upstream side of the sheet discharge tray 180 in the sheet discharge direction. When a trailing edge of the sheet S that slides along the inclination of the sheet discharge tray 180 abuts against the alignment surface, a position of a sheet bundle supported on the sheet discharge tray 180 is aligned.

In a case of performing the image formation on both sides of the sheet S, when the trailing edge of the sheet S on whose first surface the image was formed has passed through a branch portion 172, the sheet discharge roller pair 171 reverses a conveyance direction of the sheet S, and sends the sheet S to a duplex conveyance path 190. The sheet S conveyed through the duplex conveyance path 190 is again conveyed to the transfer nip N1 by an extraction roller pair 115, the pre-registration roller pair 121, and the registration roller pair 131. Then, by passing through the transfer nip N1 and the fixing unit 160, the image is formed on a second surface of the sheet S, and the sheet S is discharged to the sheet discharge tray 180.

To be noted, the sheet S may be fed not only from the cassette 111 but also from a multi-purpose tray 113. The sheet S supported on the multi-purpose tray 113 is conveyed to the pre-registration roller pair 121 by a conveyance roller pair 112 via the extraction roller pair 115. The subsequent sheet conveyance path is identical to the one described above.

Incidentally, the image forming apparatus 100 includes the image reading apparatus 102 mounted on the top of the apparatus body 101. The image reading apparatus 102 includes a platen glass on which the document is placed, and an image sensor that reads an image of the document via the platen glass. In addition, the image reading apparatus 102 includes an auto document feeder for feeding the document set on a document tray one sheet at a time and reading the image by the image sensor. The image forming apparatus 100 of this embodiment utilizes a configuration of a so-called in-drum discharge type, in which an in-drum sheet discharge space 200 for the sheet S is disposed between the image forming unit 150 and the image reading apparatus 102 in the vertical direction. In comparison with a configuration in which a sheet discharge space is arranged on a side of the apparatus body 101 by disposing the sheet discharge tray 180 on the side of the apparatus body 101, for example, the configuration of the in-drum discharge type offers an advantage that it is possible to reduce an area occupied by the image forming apparatus 100 when viewed from the above.

In addition, the image forming unit 150 described above is an example of an image forming unit, and, for example, it is acceptable to use an electrophotographic unit of a direct transfer method that directly transfers the toner image formed on the photosensitive drum onto the sheet without using an intermediate transfer member.

Deflection Sensor

Figure 2:
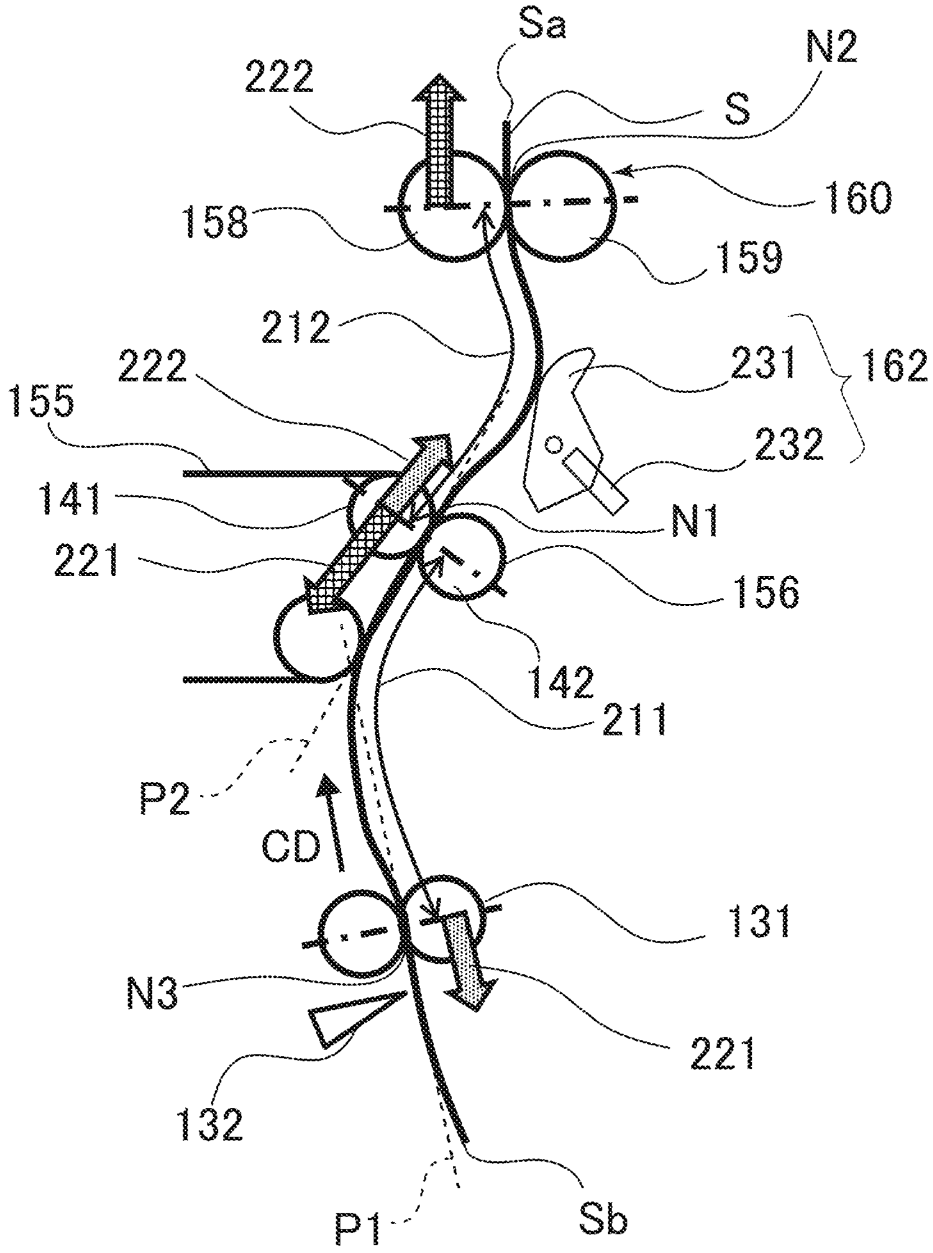
FIG. 2 is a schematic diagram illustrating a deflection sensor and a configuration of its adjacent area.
Figure 3:
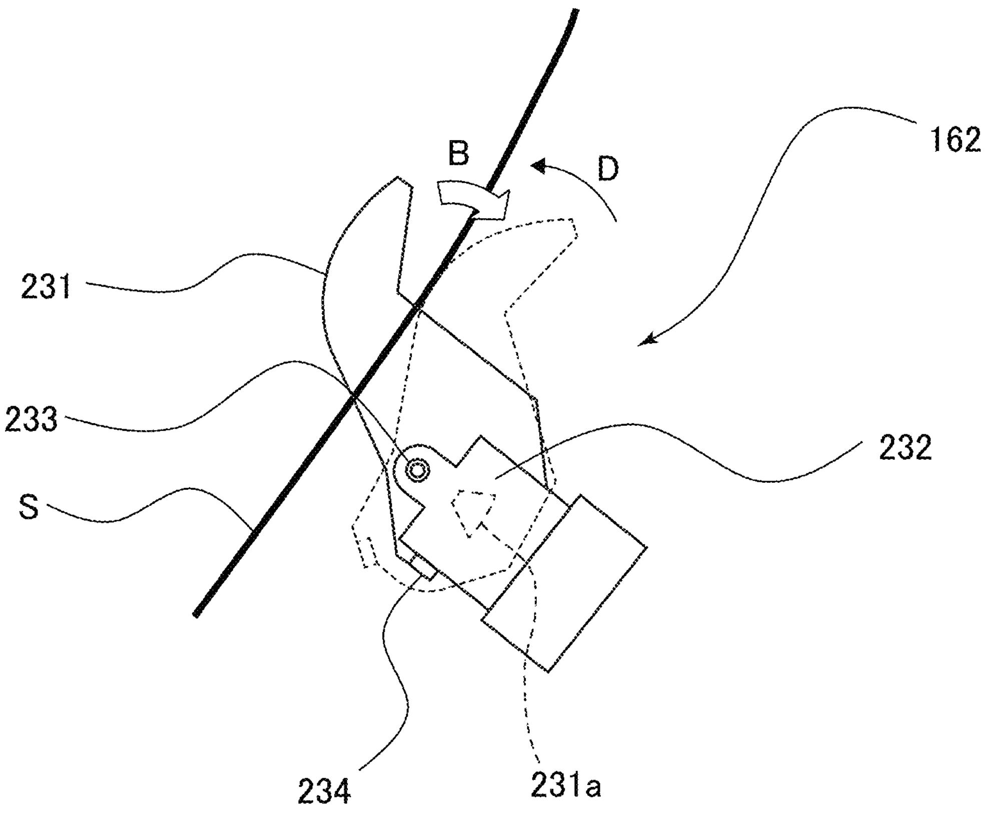
FIG. 3 is an enlarged view illustrating the deflection sensor.

Next, using FIGS. 2 and 3, a deflection sensor 162 and its adjacent configuration will be described. FIG. 2 is a schematic diagram illustrating the deflection sensor 162 and its adjacent configuration. FIG. 3 is an enlarged view illustrating the deflection sensor 162.

As illustrated in FIG. 2, the registration roller pair 131 is arranged upstream of the transfer nip N1 in a sheet conveyance direction CD, and a detection sensor 132 is arranged upstream of the registration roller pair 131 in the sheet conveyance direction CD. The detection sensor 132, serving as a detection unit, detects a position of the sheet S. The deflection sensor 162, serving as the detection unit, is arranged between the transfer and fixing nips N1 and N2 in the sheet conveyance direction CD, and detects a deflection amount of the sheet nipped by the transfer and fixing nips N1 and N2 in multiple stages.

To be noted, in the sheet conveyance direction CD, a deflection formation space SP1 is disposed between the registration roller pair 131 and the transfer nip N1, and a deflection formation space SP2 is disposed between the transfer and fixing nips N1 and N2. The sheet S can warp in the deflection formation spaces SP1 and SP2. A region of the sheet S located in the deflection formation space SP1 is referred to as a first deflection region 211, and a region of the sheet S located in the deflection formation space SP2 is referred to as a second deflection region 212.

Here, in this embodiment, when viewed in a rotational axis direction of the secondary transfer outer roller 142, serving as a facing member, a state in which the sheet S is not in a straight line but assumes a curved form is referred to as "deflection" or "forming a loop". A common tangent line P1 of the registration roller pair 131 at the nip N3 intersects with a common tangent line P2 of the intermediate transfer belt 155 and the secondary transfer outer roller 142 at the transfer nip N1. Therefore, the sheet S can warp in the deflection formation space SP1, and is guided to the transfer nip N1 by the intermediate transfer belt 155.

The deflection sensor 162 is arranged in a central portion of the deflection formation space SP2 in a width direction perpendicular to the sheet conveyance direction CD. In other words, in the width direction, the deflection sensor 162 is arranged in a central portion of a conveyance path between the transfer and fixing nips N1 and N2. The width direction is a direction that is perpendicular to the sheet conveyance direction CD and is parallel to the rotational axis direction of the secondary transfer outer roller 142 and the pressing roller 159. The deflection sensor 162 can detect the deflection amount of the sheet S in the deflection formation space SP2. The deflection amount refers to an amount (distance) by which the sheet S warps from a straight line state toward the deflection formation space SP2 when viewed in the width direction W. For example, the deflection amount can be expressed by a distance from a straight line, connecting the transfer and fixing nips N1 and N2, to an apex of the deflection (loop) formed on the sheet S.

In addition, since the deflection sensor 162 is arranged at the central portion of the deflection formation space SP2 in the width direction, the deflection sensor 162 can detect the deflection amount of the sheet ranging from the smallest to the largest size that the image forming apparatus 100 can use.

As illustrated in FIG. 3, the deflection sensor 162 includes a flag 231, which can pivot around a pivot shaft 233 as a center when pressed by the sheet S nipped by the transfer and fixing nips N1 and N2, and a sensor 232. The flag 231, serving as a pivot portion, is urged in an arrow D direction by a spring, not shown, and is positioned at a standby position when an abutment portion 234 disposed in the flag 231 abuts against the sensor 232 or a stopper, not shown, that is different from the sensor 232. The flag 231 positioned at the standby position is positioned at a location where it is pressed by the sheet S conveyed by the transfer nip N1.

When pressed by the sheet S nipped by the transfer and fixing nips N1 and N2, the flag 231 pivots in an arrow B direction, which is opposite to the arrow D direction, around the pivot shaft 233 as a center. As described above, when the flag 231 pivots in the arrow B direction and moves from the standby position to a detection position, the deflection sensor 162 is considered to be in a detection state.

Then, the sensor 232 can detect a pivot amount of the flag 231 in the arrow B direction from the standby position to the detection position. For example, the sensor 232 includes a photo interrupter incorporating a light emitting element and a light receiving element, and is constituted from an optical rotary encoder. The light emitting element of the photo interrupter is constituted from, for example, a light emitting diode, and the light receiving element is constituted from, for example, a phototransistor.

In a case where the sensor 232 is a transmissive type encoder, a detected portion 231*a* includes a plurality of slits that allow light emitted from the light emitting element to pass through. In a case where the sensor 232 is a reflection type encoder, the detected portion 231*a* includes a plurality of concave-convex structures or slits that can either reflect or not reflect the light emitted from the light emitting element. The light receiving element of the sensor 232 outputs a current corresponding to an amount of received light, and a waveform forming circuit within the sensor 232 converts a waveform of the current into a pulse signal, which is then output as a voltage signal. In other words, the sensor 232 outputs the pulse signal according to the pivot amount of the flag 231.

As described above, since the sensor 232 outputs the pulse signal according to the pivot amount of the flag 231, the deflection sensor 162 can detect the deflection amount of the sheet S. To be noted, the resolution of the deflection sensor 162 can be set arbitrarily, and the deflection sensor 162 can detect at least equal to or more than two deflection amounts of the sheet S.

Control Block

Figure 4:
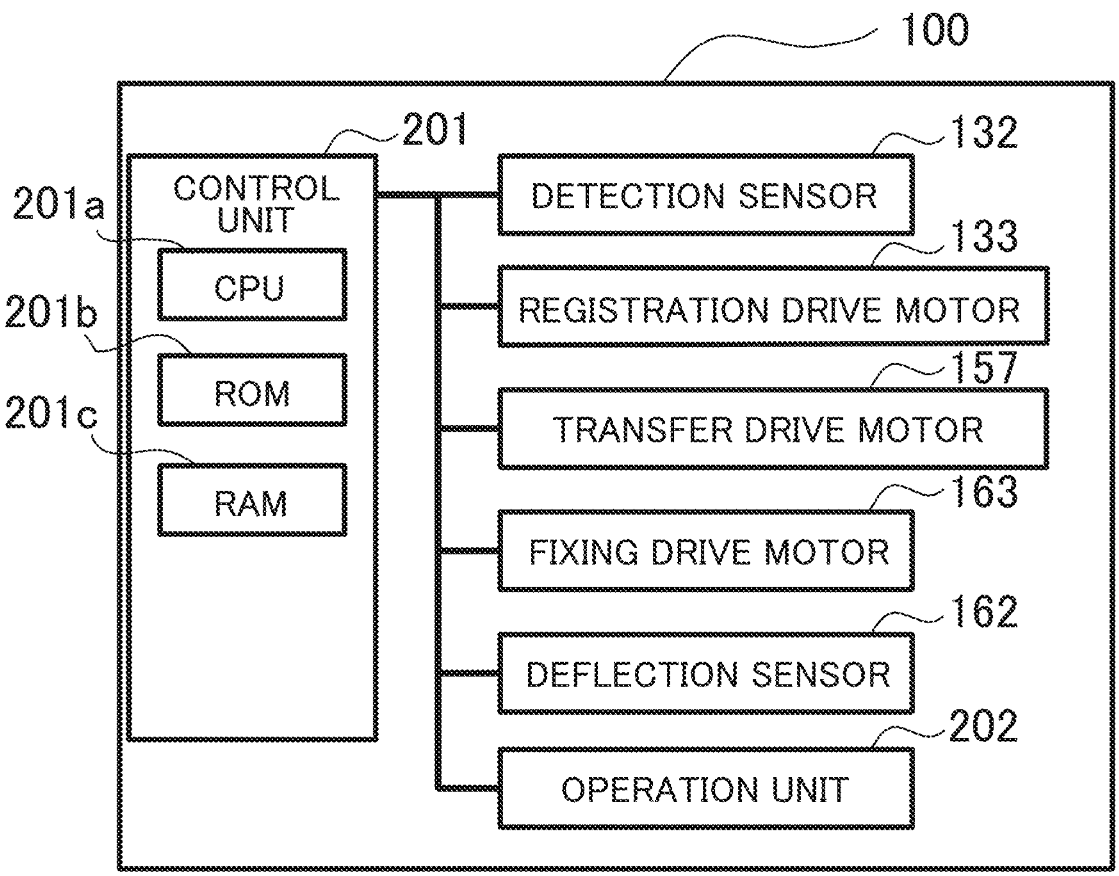
FIG. 4 is a block diagram illustrating a control block of the image forming apparatus.

FIG. 4 is a block diagram illustrating a control block of the image forming apparatus 100. The image forming apparatus 100 includes a control unit 201. The control unit 201 includes a central processing unit (CPU) 201*a*, a read only memory (ROM) 201*b*, and a random access memory (RAM) 201*c*. The CPU 201*a* reads and executes various programs stored in the ROM 201*b*. The RAM 201*c* is used as a workspace of the CPU 201*a*.

The control unit 201 is connected to the detection sensor 132, a registration drive motor 133, a transfer drive motor 157, the fixing drive motor 163, the deflection sensor 162, and an operation unit 202. The registration drive motor 133 drives the registration roller pair 131. The transfer drive motor 157 drives the secondary transfer inner roller 141. The fixing drive motor 163 drives the fixing roller 158. By controlling these registration drive motor 133, transfer drive motor 157, and fixing drive motor 163, the control unit 201 can control a conveyance speed of the sheet S at the registration roller pair 131, the transfer nip N1, and the fixing nip N2. In particular, the control unit 201 controls the conveyance speed (fixing conveyance speed) of the sheet S by the fixing nip N2 based on a detection result of the deflection sensor 162.

To be noted, the transfer drive motor 157 and the fixing drive motor 163 may respectively drive the secondary transfer outer roller 142 and the pressing roller 159. That is, it is acceptable if the transfer drive motor 157 and the fixing drive motor 163 are configured to respectively control the conveyance speed of the sheet S at the transfer and fixing nips N1 and N2.

The operation unit 202 is constituted from such as a touch panel and a physical button, which are mounted on an exterior of the image forming apparatus 100. By operating the operation unit 202, a user can input information such as the size and grammage of the sheet S used in the image forming apparatus 100.

Deflection Amount Control

Figure 5:
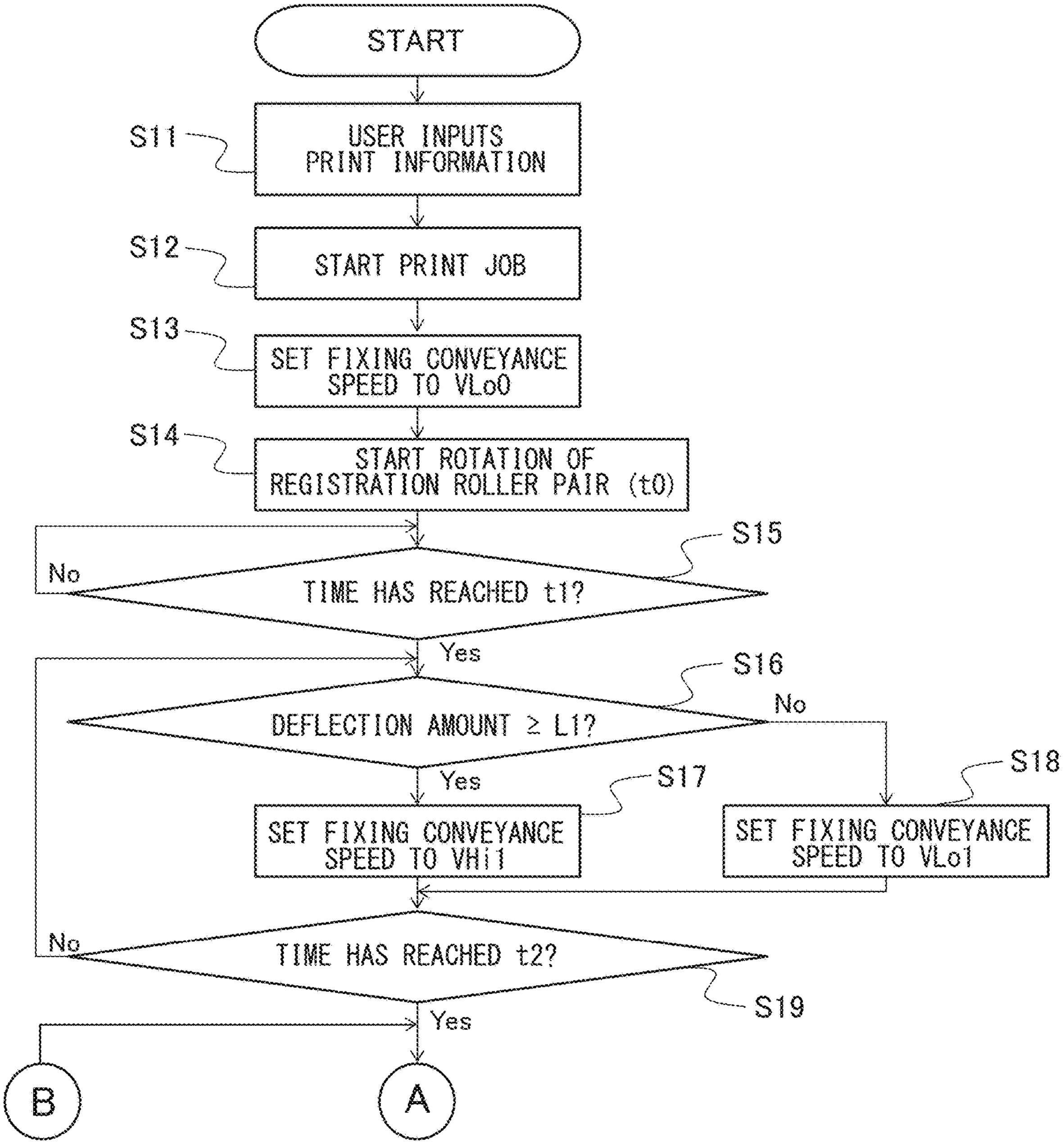
FIG. 5 is a flowchart illustrating deflection amount control.
Figure 6:
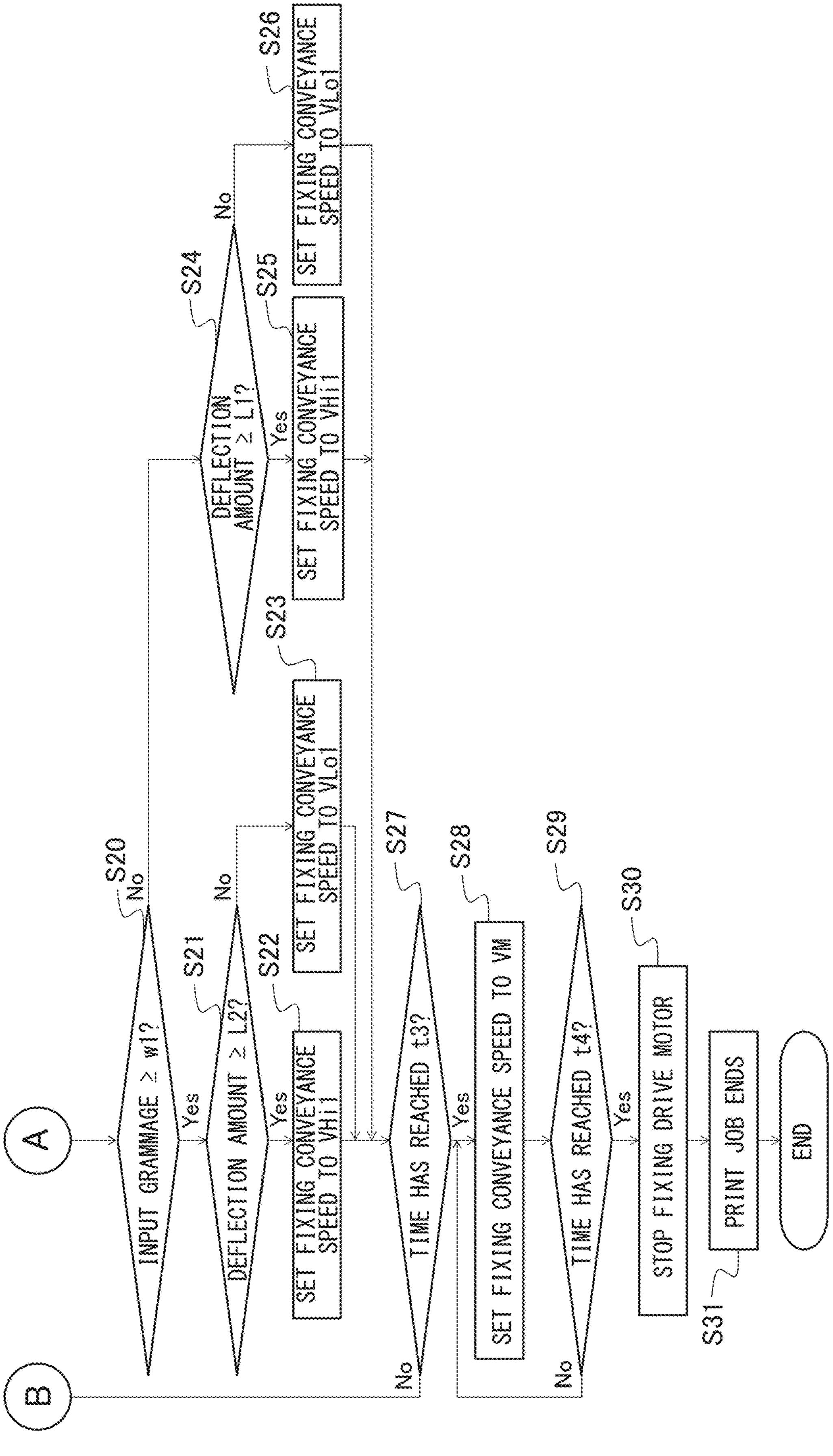
FIG. 6 is a flowchart illustrating the deflection amount control.
Figure 7:
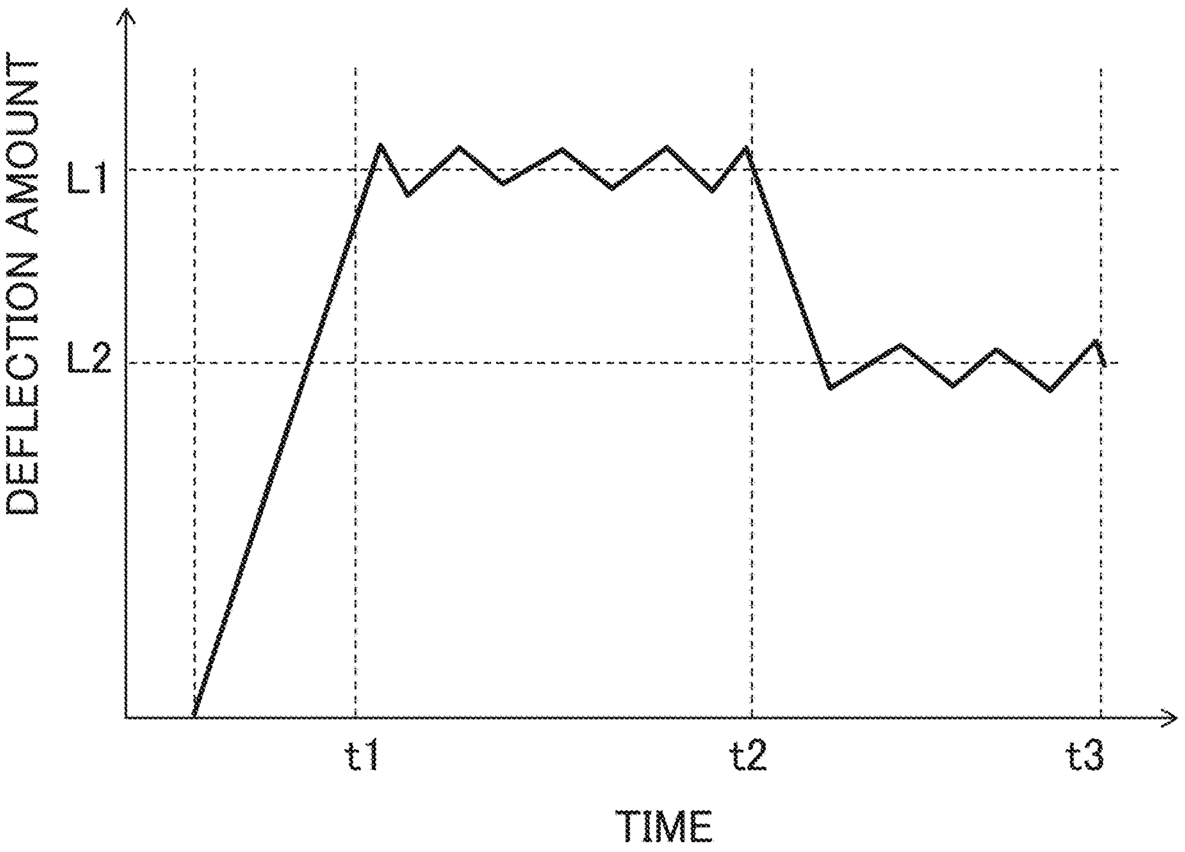
FIG. 7 is a graph illustrating a change in the deflection amount of the sheet when the deflection amount control is performed.
Figure 8:
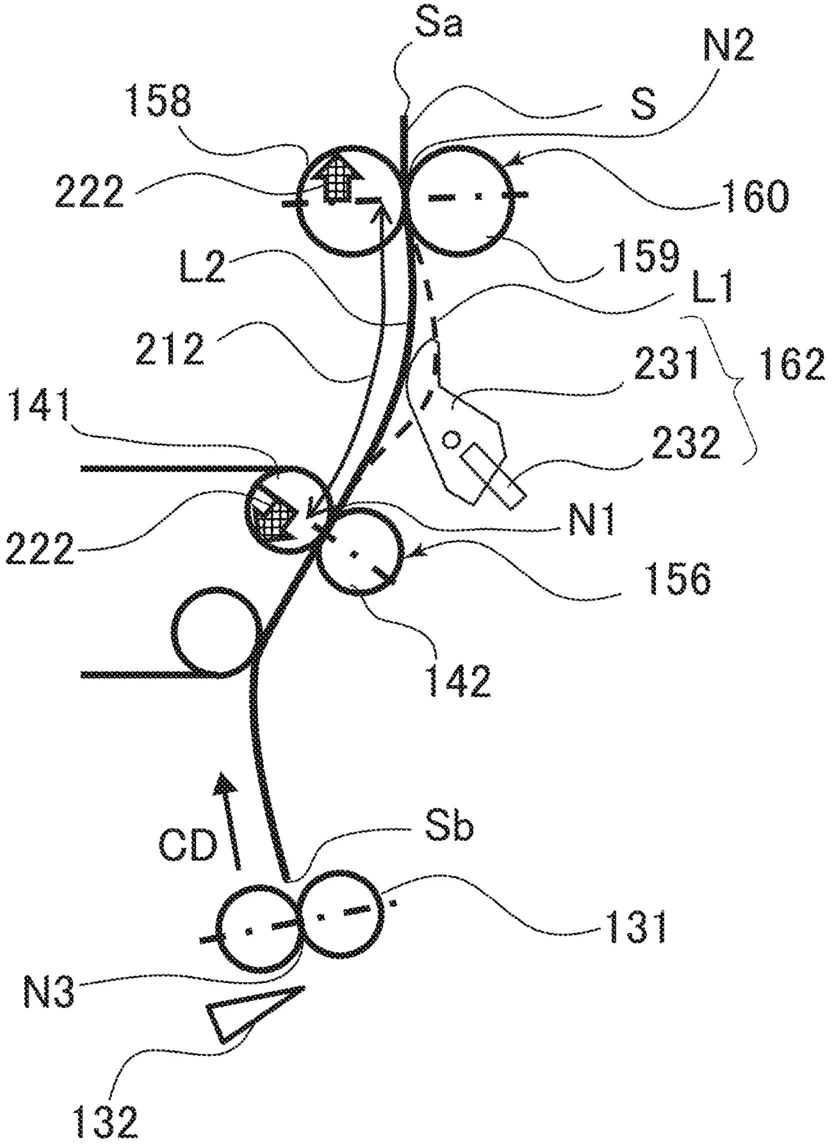
FIG. 8 is a diagram illustrating a state in which a trailing edge of the sheet passes through a registration roller pair.

Next, using FIGS. 5 to 8, the deflection amount control (loop amount control) of the sheet S by the control unit 201 will be described. FIGS. 5 and 6 are a flowchart illustrating the deflection amount control. FIG. 7 is a graph illustrating a change in the deflection amount of the sheet S during the execution of the deflection amount control. FIG. 8 is a diagram illustrating a state in which the trailing edge Sb of the sheet S passes through the registration roller pair 131.

As illustrated in FIG. 5, before starting a print job, the user inputs the information such as the size and grammage of the sheet S to be used from the operation unit 202 (STEP S11). Then, after the relevant information is input, the print job is started (STEP S12). Then, the control unit 201 controls the fixing drive motor 163 such that the conveyance speed of the sheet S at the fixing nip N2 becomes a speed VLo0 (STEP S13). Hereinafter, the conveyance speed of the sheet S at the fixing nip N2 is referred to as the fixing conveyance speed. The fixing conveyance speed is the same as a peripheral speed of the fixing roller 158 and the pressing roller 159, and is controlled by adjusting a rotational speed of the fixing drive motor 163.

To be noted, in this embodiment, the speed VLo0 is lower than a speed VM, which is the conveyance speed of the sheet S at the transfer nip N1, and is configured such that the sheet S is not tensioned by the fixing nip N2 in the second deflection region 212 (refer to FIG. 2). Thereby, it is possible to suppress a scattering of an unfixed toner image transferred onto the sheet S.

Next, after correcting the skew of the sheet S by abutting a leading edge of the sheet S against the nip N3 of the registration roller pair 131, which is in a stopped state, the control unit 201 rotates the registration roller pair 131 by driving the registration drive motor 133 (STEP S14). Thereby, the sheet S is conveyed toward the transfer and fixing nips N1 and N2. Time at which the registration roller pair 131 has started rotation is referred to as time to.

Thereafter, the control unit 201 determines whether or not the time has reached time t1 (STEP S15). As illustrated in FIG. 2, the time t1 refers to time at which the leading edge Sa of the sheet S has passed through the fixing nip N2 and the trailing edge Sb of the sheet S has not passed through the nip N3 of the registration roller pair 131. The time t1 to t4 appearing below are calculated with reference to the time to and computed based on a distance between each roller, the length of the sheet in the sheet conveyance direction CD, and a rotational speed of each roller.

Then, in a case where the control unit 201 determines that the time has reached the time t1 (STEP S15: Yes), the control unit 201 proceeds to STEP S16. That is, the control unit 201 rotates the fixing and pressing rollers 158 and 159 to maintain the fixing conveyance speed at the speed VLo0 until at least the time has reached the time t1. To be noted, in this embodiment, the speed VLo0 is set such that the deflection amount in the second deflection region 212 becomes slightly smaller than a first deflection amount L1 at the time t1.

Next, the control unit 201 determines whether or not the deflection amount in the second deflection region 212 is equal to or more than the first deflection amount L1 (STEP S16). The deflection amount in the second deflection region 212 is always detected by the deflection sensor 162. In a case where the deflection amount in the second deflection region 212 is determined to be equal to or more than the first deflection amount L1 (STEP S16: Yes), the control unit 201 sets the fixing conveyance speed to a speed VHi1, serving as a first speed, (STEP S17), and proceeds to STEP S19. In addition, in a case where the deflection amount in the second deflection region 212 is determined to be less than the first deflection amount L1 (STEP S16: No), the control unit 201 sets the fixing conveyance speed to a speed VLo1, serving as a second speed, (STEP S18), and proceeds to STEP S19. To be noted, the first deflection amount L1 is an appropriate deflection amount for stably conveying unfixed toner on the sheet.

The speed VHi1 is faster than the speed VM that is the conveyance speed of the sheet S at the transfer nip N1, and the speed VLo1 is slower than the speed VM. That is, when the fixing conveyance speed is set to the speed VHi1, the deflection amount in the second deflection region 212 decreases, and, when the fixing conveyance speed is set to the speed VLo1, the deflection amount in the second deflection region 212 increases. In other words, the control unit 201 adjusts the deflection amount in the second deflection region 212 by switching the fixing conveyance speed between the speeds VHi1 and VLo1.

Next, the control unit 201 determines whether or not the time has reached the time t2 (STEP S19). The time t2 is later than the time t1, and refers to time at which the sheet S is nipped by the transfer and fixing nips N1 and N2 and the trailing edge Sb of the sheet S has not passed through the nip N3 of the registration roller pair 131. In a case where the time has not reached the time t2 (STEP S19: No), the control unit 201 returns to STEP S16. That is, from the time t1 to the time t2, by repeating the processes of STEPS S16 to S19, the control unit 201 controls the fixing conveyance speed such that the deflection amount in the second deflection region 212 maintains the first deflection amount L1. At this time, as illustrated in FIG. 2, at the transfer nip N1, a reaction force 221 of the deflection of the sheet S in the first deflection region 211 and a reaction force 222 of the deflection of the sheet S in the second deflection region 212 act to offset each other.

In a case where it is determined that the time has reached the time t2 (STEP S19: Yes), as illustrated in FIG. 6, the control unit 201 determines whether or not the grammage of the sheet S input at the operation unit 202 is equal to or more than a threshold grammage w1 (STEP S20). In a case where it is determined that the grammage of the sheet S is equal to or more than the threshold grammage w1 (STEP S20: Yes), the control unit 201 determines whether or not the deflection amount in the second deflection region 212 is equal to or more than a second deflection amount L2 smaller the first deflection amount L1 (STEP S21).

In a case where it is determined that the deflection amount in the second deflection region 212 is equal to or more than the second deflection amount L2 (STEP S21: Yes), the control unit 201 sets the fixing conveyance speed to the speed VHi1 (STEP S22), and proceeds to STEP S27. In addition, in a case where it is determined that the deflection amount in the second deflection region 212 is less than the second deflection amount L2 (STEP S21: No), the control unit 201 sets the fixing conveyance speed to the speed VLo1 (STEP S23), and proceeds to STEP S27.

On the other hand, in a case where it is determined that the grammage of the sheet S is less than the threshold grammage w1 (STEP S20: No), the control unit 201 determines whether or not the deflection amount in the second deflection region 212 is equal to or more that the first deflection amount L1 (STEP S24).

In a case where it is determined that the deflection amount in the second deflection region 212 is equal to or more than the first deflection amount L1 (STEP S24: Yes), the control unit 201 sets the fixing conveyance speed to the speed VHi1 (STEP S26), and proceeds to STEP S27. In addition, in a case where it is determined that the deflection amount in the second deflection region 212 is less than the first deflection amount L1 (STEP S24: No), the control unit 201 sets the fixing conveyance speed to the speed VLo1 (STEP S26), and proceeds to STEP S27.

Next, at STEP S27, the control unit 201 determines whether or not the time has reached the time t3 (STEP S27). The time t3 is later than the time t2, and refers to time at which the trailing edge Sb of the sheet S passes through the nip N3 of the registration roller pair 131. In a case where the time has not reached the time t3 (STEP S27: No), the control unit 201 returns to STEP S20. That is, from the time t2 to the time t3, with respect to the sheet S having a grammage that is equal to more than the threshold grammage w1, by repeating the processes of STEPS S21 to S23, the control unit 201 controls the fixing conveyance speed such that the deflection amount in the second deflection region 212 maintains the second deflection amount L2. In addition, with respect to the sheet S having the grammage that is less than the threshold grammage w1, by repeating the processes of STEPS S24 to S26, the control unit 201 controls the fixing conveyance speed such that the deflection amount in the second deflection region 212 maintains the first deflection amount L1.

For example, FIG. 7 illustrates the deflection amount in the second deflection region 212 when the deflection amount control is performed with respect to the sheet S having the grammage equal to or more than the threshold grammage w1. As illustrated in FIG. 7, the deflection amount in the second deflection region 212 maintains the first deflection amount L1 from the time t1 to the time t2, and maintains the second deflection amount L2 from the time t2 to the time t3.

In a case where, at STEP S27, it is determined that the time has reached the time t3 (STEP S27: Yes), the control unit 201 sets the fixing conveyance speed to the speed VM (STEP S28). While, in this embodiment, at STEP S28, the fixing conveyance speed is set to the speed VM that is the same speed as the conveyance speed of the sheet S at the transfer nip N1, it is not limited to this. For example, at STEP S28, the fixing conveyance speed may be set to any of the speeds VLo0, VHi1, and VLo1.

Next, the control unit 201 determines whether or not the time has reached the time t4 (STEP S29). The time t4 is later than the time t3, and refers to time at which the trailing edge Sb of the sheet S passes through the fixing nip N2. In a case where the time has not reached the time t4 (STEP S29: No), the control unit 201 returns to STEP S28. In a case where it is determined that the time has reached the time t4 (STEP S29: Yes), the control unit 201 stops the fixing and pressing rollers 158 and 159 by stopping the fixing drive motor 163 (STEP S30). Thereafter, the print job ends (STEP S31) when the sheet S is discharged to the outside of the apparatus by the sheet discharge roller pair 171, and, also, the deflection amount control ends.

Incidentally, when the trailing edge Sb of the sheet S passes through the nip N3 of the registration roller pair 131 at the time t3, as illustrated in FIG. 8, the deflection of the sheet S in the first deflection region 211 is released. Then, the reaction force 221 (refer to FIG. 2) of the deflection of the sheet S in the first deflection region 211, which acts in a direction to offset the reaction force 222 (refer to FIG. 2) of the deflection of the sheet S in the second deflection region 212, disappears. Thereby, a force acting on the sheet S at the transfer nip N1 abruptly changes. In a case where the deflection amount is the same, the reaction force 221 tends to become greater as the stiffness of the sheet S increases. Therefore, when the trailing edge of a high grammage sheet such as the thick paper passes through the nip N3 of the registration roller pair 131, there is a risk that the force acting on the sheet at the transfer nip N1 may change more abruptly and the sheet may slip against the transfer nip N1.

Therefore, in this embodiment, with respect to the sheet S whose grammage that is input at the operation unit 202 is equal to or more than the threshold grammage w1, the control unit 201 controls the fixing conveyance speed such that the deflection amount becomes the second deflection amount L2 before the trailing edge Sb passes through the nip N3 of the registration roller pair 131. In more particular, the control unit 201 can perform a first mode that performs a first process and a second process during a time when a single sheet of the sheet S with the grammage equal to or more than the threshold grammage w1 is nipped by the registration roller pair 131, the transfer nip N1, and the fixing nip N3. At the time t2 that is calculated based on a detection result of the detection sensor 132, the control unit 201 transitions from the first process to the second process. In addition, in a case of conveying the sheet S with the grammage less than the threshold grammage w1, the control unit 201 can perform a second mode in which the first process is continued until at least the trailing edge Sb of the sheet S passes through the registration roller pair 131. In the second mode, since the stiffness of the sheet S is lower in comparison with the first mode, the reaction force 222 is relatively suppressed even at the first deflection amount L1. Therefore, it is possible to stably convey the unfixed toner on the sheet while maintaining the deflection amount at the first deflection amount L1.

The first process is a process in which the conveyance speed (fixing conveyance speed) of the sheet S by the fixing nip N2 is controlled such that the deflection amount in the second deflection region 212 becomes the first deflection amount L1. The second process is a process in which the conveyance speed (fixing conveyance speed) of the sheet S by the fixing nip N2 is controlled such that the deflection amount in the second deflection region 212 becomes the second deflection amount L2. That is, the first mode described above is performed in a case of conveying the sheet with a first stiffness, and includes STEPS S16 to S19 corresponding to the first process and STEPS S20 to S23, and S27 corresponding to the second process. In addition, the second mode described above is performed in a case of conveying the sheet with a second stiffness smaller than the first stiffness, and includes STEPS S16 to S19, S20, and S24 to S27 corresponding to the first process.

By the second process (STEPS S20 to S23, and S27) of the first mode described above, before the trailing edge Sb of the sheet S has passed through the nip N3 of the registration roller pair 131, the deflection amount in the second deflection region 212 can be adjusted to the relatively small second deflection amount L2. Thereby, it is possible to reduce the reaction force of the deflection of the sheet S in the second deflection region 212, and is possible to reduce the change in the force acting on the sheet S at the transfer nip N1 when the trailing edge Sb of the sheet S has passed through the nip N3 of the registration roller pair 131. Therefore, it is possible to reduce the slippage of the sheet S at the transfer nip N1, and is possible to suppress image defects such as image disturbances caused by the slippage. In addition, it is possible to satisfactorily form the image on various media such as high stiffness thick paper, low stiffness thin paper, and regular paper.

Other Embodiments

To be noted, while, in this embodiment, in the case where the grammage of the sheet S that is input through the operation unit 202 is equal to or more than the threshold grammage w1, the second mode to control the fixing conveyance speed such that the deflection amount in the second deflection region 212 becomes the second deflection amount L2 is performed, it is not limited to this. For example, the second mode described above may be performed regardless of the grammage of the sheet S that is conveyed.

In addition, while, in this embodiment, in the first mode, the deflection amount in the second deflection region 212 is changed from the first deflection amount L1 to the second deflection amount L2 in two stages, it is not limited to this. For example, the deflection amount of the second deflection region 212 may be changed in equal to or more than three stages.

In addition, while, in this embodiment, whether or not to perform the second process is determined based on the grammage of the sheet S that is input through the operation unit 202, it is not limited to this. For example, by arranging a media sensor, which can detect at least one of thickness and surface properties, in the cassette 111 or the sheet conveyance path, it is acceptable to determine whether or not to perform the second process based on a detection result of the media sensor. In any case, it is acceptable if it is configured such that the first mode described above is performed in the case of conveying the sheet with the first stiffness and the second mode described above is performed in the case of conveying the sheet with the second stiffness smaller than the first stiffness.

In addition, while, in this embodiment, the encoder-type sensor is applied to the deflection sensor 162, it is not limited to this. It is acceptable if the deflection sensor 162 can detect at least equal to more than two deflection amounts of the sheet S, and, for example, the deflection sensor 162 may include equal to or more than two photo interrupters to detect the pivot position of the flag 231.

In addition, while, in this embodiment, the fixing unit 160 is constituted from the fixing roller 158 and the pressing roller 159, it is not limited to this. For example, instead of the fixing roller 158, it is acceptable to apply a fixing film that incorporates a heater. At this time, the heater may come into direct contact with the fixing film, or may come into contact with the film via a sheet material with high thermal conductivity, such as an iron alloy or aluminum. In addition, instead of the fixing roller 158, it is acceptable to apply a fixing belt including a heat generation layer, and the heat generation layer may be heated by electromagnetic induction. In addition, the type of heater is not specifically limited, and a ceramic heater, a halogen heater, or the like can be applied.

In addition, while, in this embodiment, the flag 231 is configured to pivot around the pivot shaft 233 as a center, it is not limited to this. That is, it is acceptable if the flag 231 is moved when pressed by the sheet S nipped by the transfer and fixing nips N1 and N2, and, for example, the flag 231 may slide. Then, the sensor 232 may change an output value corresponding to a movement amount of the flag 231. In addition, it is acceptable that, by including a second flag, which interlocks with the flag 231, in the deflection sensor 162, the sensor 232 detects a pivot amount of the second flag.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-195815, filed Nov. 17, 2023, which is hereby incorporated by reference herein in its entirety.

What is claimed is:

1. An image forming apparatus comprising:

a conveyance unit configured to convey a sheet in a sheet conveyance direction while nipping the sheet;

a transfer unit arranged downstream of the conveyance unit in the sheet conveyance direction, configured to convey the sheet while nipping the sheet, and configured to transfer a toner image onto the sheet;

a fixing unit arranged downstream of the transfer unit in the sheet conveyance direction, configured to convey the sheet while nipping the sheet, and configured to fix the toner image transferred by the transfer unit on the sheet;

a first detection unit arranged between the transfer unit and the fixing unit in the sheet conveyance direction and configured to detect a deflection amount of the sheet nipped by the transfer unit and the fixing unit in multiple stages; and a control unit configured to control a conveyance speed of the sheet by the fixing unit based on a detection result of the first detection unit, wherein the control unit is configured to perform a first mode that performs, during a time when a single first sheet is being nipped by the conveyance unit, the transfer unit, and the fixing unit, a first process of controlling the conveyance speed of the first sheet by the fixing unit such that the deflection amount becomes a first deflection amount, and a second process, performed after the first process, of controlling the conveyance speed of the first sheet by the fixing unit such that the deflection amount becomes a second deflection amount smaller than the first deflection amount.

2. The image forming apparatus according to claim 1, wherein the control unit continues the second process until at least a trailing edge of the first sheet has passed through the conveyance unit after the first process in the first mode.

3. The image forming apparatus according to claim 1, wherein the control unit performs the first mode in a case where the first sheet has a first stiffness, and performs, for a second sheet, a second mode that continues the first process of controlling the conveyance speed of the second sheet by the fixing unit such that the deflection amount of the second sheet becomes the first deflection amount until at least a trailing edge of the second sheet has passed through the conveyance unit, the second sheet having a second stiffness lower than the first stiffness.

4. The image forming apparatus according to claim 1, wherein the control unit adjusts the deflection amount by switching the conveyance speed of the first sheet by the fixing unit between a first speed faster than the conveyance speed of the first sheet by the transfer unit and a second speed slower than the conveyance speed of the first sheet by the transfer unit.

5. The image forming apparatus according to claim 1, wherein the first detection unit includes a pivot portion that is configured to pivot when pressed by the first sheet nipped by the transfer unit and the fixing unit, and a rotary encoder that is configured to output a pulse signal corresponding to a pivot amount of the pivot portion.

6. The image forming apparatus according to claim 1, wherein the conveyance unit includes a roller pair, and is configured to correct a skew of the first sheet by abutting the first sheet against a nip of the roller pair that is in a stopped state.

7. The image forming apparatus according to claim 6, wherein the transfer unit includes an image bearing member that is configured to bear the toner image, and a facing member that faces the image bearing member and is configured to form a transfer nip with the image bearing member, and wherein a common tangent line of the roller pair at the nip intersects with a common tangent line of the image bearing member and the facing member at the transfer nip.

8. The image forming apparatus according to claim 1, wherein the first sheet nipped by the conveyance unit, the transfer unit and the fixing unit warps between the conveyance unit and the transfer unit, and warps between the transfer unit and the fixing unit.

9. The image forming apparatus according to claim 1, further comprising a second detection unit arranged upstream of the conveyance unit in the sheet conveyance direction and configured to detect a position of the first sheet, wherein, in the first mode, the control unit transitions from the first process to the second process based on a detection result of the second detection unit.

10. The image forming apparatus according to claim 1, wherein the control unit is configured to perform (i) the first process of controlling the conveyance speed of the first sheet by the fixing unit based on the detection result of the first detection unit such that the deflection amount becomes the first deflection amount, and (ii) the second process of controlling the conveyance speed of the first sheet by the fixing unit based on the detection result of the first detection unit such that the deflection amount becomes the second deflection amount.

* * * * *